US008960931B2

(12) United States Patent
Chen et al.

(10) Patent No.: US 8,960,931 B2
(45) Date of Patent: Feb. 24, 2015

(54) LUMINOUS KEYBOARD DEVICE

(71) Applicant: Primax Electronics Ltd., Neihu, Taipei (TW)

(72) Inventors: Chung-Yuan Chen, Taipei (TW); Hsuan-Wei Ho, Taipei (TW)

(73) Assignee: Primax Electronics Ltd., Taipei (TW)

(*) Notice: Subject to any disclaimer, the term of this patent is extended or adjusted under 35 U.S.C. 154(b) by 29 days.

(21) Appl. No.: 13/955,501

(22) Filed: Jul. 31, 2013

(65) Prior Publication Data

US 2014/0369021 A1 Dec. 18, 2014

(30) Foreign Application Priority Data

Jun. 17, 2013 (TW) ............................. 102121386 A

(51) Int. Cl.
*G01D 11/28* (2006.01)
*H01H 13/83* (2006.01)

(52) U.S. Cl.
CPC ..................................... *H01H 13/83* (2013.01)
USPC .................. 362/23.03; 362/23.01; 362/23.02; 362/23.19; 362/23.2

(58) Field of Classification Search
None
See application file for complete search history.

(56) References Cited

U.S. PATENT DOCUMENTS

| | | | | |
|---|---|---|---|---|
| 5,359,503 | A * | 10/1994 | Myodo et al. | 362/127 |
| 2007/0268681 | A1* | 11/2007 | Tsai et al. | 362/85 |
| 2007/0296706 | A1* | 12/2007 | Wang et al. | 345/170 |
| 2009/0260965 | A1* | 10/2009 | Chang | 200/314 |

* cited by examiner

*Primary Examiner* — Natalie Walford
(74) *Attorney, Agent, or Firm* — Kirton McConkie; Evan R. Witt

(57) ABSTRACT

A luminous keyboard device includes plural keys, a supporting plate, a light-emitting element, and a light guide plate. The supporting plate has a supporting plate opening, and the supporting plate opening has a light-guiding slant surface. The light-emitting element is inserted into the supporting plate opening for emitting plural light beams. When the plural light beams are emitted by the light-emitting element, the plural light beams are guided by the light-guiding slant surface to be introduced into the light guide plate, and the plural light beams are directed to the plural keys to illuminate the plural keys. Consequently, the light amount of the light beams to be introduced into the light guide plate will be increased.

14 Claims, 8 Drawing Sheets

LUMINOUS KEYBOARD DEVICE

FIELD OF THE INVENTION

The present invention relates to a keyboard device, and more particularly to a luminous keyboard device.

BACKGROUND OF THE INVENTION

Generally, the widely-used peripheral input device of a computer system includes for example a mouse device, a keyboard device, a trackball device, or the like. Via the keyboard device, characters and symbols can be inputted into the computer system directly. As a consequence, most users and most manufacturers of input devices pay much attention to the development of keyboard devices.

FIG. 1 is a schematic top view illustrating the outer appearance of a conventional keyboard device. As shown in FIG. 1, there are plural keys 10 on a surface of the conventional keyboard device 1. These keys 10 are classified into several types, e.g. ordinary keys 101, numeric keys 102 and function keys 103. When one of these keys 10 is depressed by the user's finger, a corresponding signal is issued to the computer, and thus the computer executes a function corresponding to the depressed key. For example, when an ordinary key 101 is depressed, a corresponding English letter or symbol is inputted into the computer. When a numeric key 102 is depressed, a corresponding number is inputted into the computer. In addition, the function keys 103 (F1~F12) can be programmed to provide various functions. For example, the conventional keyboard device 1 is a keyboard device for a notebook computer.

With the maturity of the computing technologies, the keyboard manufacturers make efforts in designing novel keyboard devices with special functions in order to meet diversified requirements of different users. For this reason, a luminous keyboard device has been introduced into the market. The outer appearance of the conventional luminous keyboard device is substantially similar to the outer appearance of the conventional keyboard device 1. Since the luminous keyboard device provides the function of illuminating the keys, the inner structure of the luminous keyboard device is different from the inner structure of the keyboard device without the illuminating function. Hereinafter, the inner structure of the luminous keyboard device will be illustrated in more details. FIG. 2 is a schematic cross-sectional view illustrating a conventional luminous keyboard device. As shown in FIG. 2, the conventional luminous keyboard device 2 comprises plural keys 20, a membrane switch circuit module 21, a light guide plate 22, a backlight module 23, a supporting plate 24, a reflecting plate 25, and a base (not shown). Each key 20 comprises a keycap 201, a scissors-type connecting element 202 and an elastic element 203. From top to bottom, the keycap 201, the scissors-type connecting element 202, the elastic element 203, the membrane switch circuit module 21, the supporting plate 24, the light guide plate 22, the reflecting plate 25 and the base of the conventional luminous keyboard device 2 are sequentially shown. The backlight module 23 is located at a side of the membrane switch circuit module 22. For example, the conventional luminous keyboard device 2 is a keyboard device of a notebook computer (not shown), and the base is installed on the notebook computer.

In the key 20, the keycap 201 is exposed outside the conventional luminous keyboard device 2, so that the keycap 201 can be depressed by the user. The scissors-type connecting element 202 is used for connecting the keycap 201 and the supporting plate 24. The elastic element 203 is penetrated through the scissors-type connecting element 202. In addition, both ends of the elastic element 203 are contacted with the keycap 201 and the membrane switch circuit module 21, respectively. The membrane switch circuit module 21 comprises an upper wiring board 211, a spacer layer 212, and a lower wiring board 213. The upper wiring board 211, the spacer layer 212 and the lower wiring board 213 are all made of a light-transmissible material. The light-transmissible material is for example polycarbonate (PC) or polyethylene (PE). The upper wiring board 211 has plural upper contacts 2111. The spacer layer 212 is disposed under the upper wiring board 211, and comprises plural perforations 2121 corresponding to the plural upper contacts 2111. The lower wiring board 213 is disposed under the spacer layer 212, and comprises plural lower contacts 2131 corresponding to the plural upper contacts 2111. The plural lower contacts 2131 and the plural upper contacts 2111 are collectively defined as plural key switches 214.

The backlight module 23 comprises an illumination circuit board 231 and plural light-emitting elements 232. For clarification and brevity, only two light-emitting elements 232 are shown in the drawing. The illumination circuit board 231 is disposed under the membrane switch circuit module 21 for providing electric power to the plural light-emitting elements 232. The plural light-emitting elements 232 are disposed on the illumination circuit board 231. In addition, the plural light-emitting elements 232 are inserted into plural reflecting plate openings 251 of the reflecting plate 25 and plural light guide plate openings 221 of the light guide plate 22, respectively. By acquiring the electric power, the plural light-emitting elements 232 are driven to emit plural light beams B. Moreover, the plural light beams B are introduced into the light guide plate 22. For example, the plural light-emitting elements 232 are side-view light-emitting diodes. The light guide plate 22 is used for guiding the plural light beams B to the keycaps 201. As shown in FIG. 2, the supporting plate 24 is arranged between the membrane switch circuit module 21 and the light guide plate 22 for supporting the keycap 201, the scissors-type connecting element 202, the elastic element 203 and the membrane switch circuit module 21. The reflecting plate 25 is disposed under the light guide plate 22 for reflecting the plural light beams B. Consequently, the plural light beams B are directed upwardly, and the utilization efficiency of the light beams B is enhanced. The two lateral edges 252 of the reflecting plate 25 are bent upwardly to enclose plural lateral edges 222 of the light guide plate 22. For clarification and brevity, only one lateral edge 252 of the reflecting plate 25 is shown in the drawing. Due to the lateral edges 252 of the reflecting plate 25, the problem of causing light leakage through the lateral edges 222 of the light guide plate 22 will be eliminated.

In the conventional luminous keyboard device 2, each keycap 201 has a light-outputting zone 2011. The light-outputting zone 2011 is located at a character region or a symbol region of the keycap 201. Moreover, the position of the light-outputting zone 2011 is aligned with the position of a corresponding light-guiding dot 223 of the light guide plate 22. The light beams can be guided upwardly to the light-outputting zone 2011 by the corresponding light-guiding dot 223. The supporting plate 24 comprises plural supporting plate openings 241. The plural supporting plate openings 241 are aligned with corresponding light-guiding dots 223 and corresponding light-outputting zones 2011. On the other hand, since the membrane switch circuit module 21 is made of the light-transmissible material, the plural light beams B can be transmitted through the membrane switch circuit module 21.

Consequently, after the plural light beams B are guided by the light-guiding dots 223, the plural light beams B are sequentially transmitted through the plural supporting plate openings 241 and the membrane switch circuit module 21 and directed to the plural light-outputting zones 2011, thereby illuminating the character region or the symbol region of the keycap 201. Under this circumstance, the illuminating function is achieved.

Generally, the supporting plate 24 is made of an opaque material. For example, the supporting plate 24 is made of a metallic material. Consequently, the plural light beams B are hindered by the supporting plate 24. In other words, the supporting plate 24 should have the plural supporting plate openings 241 for allowing the plural light beams B to go through.

Recently, the general trends in designing electronic devices are toward slimness, and thus the conventional luminous keyboard device needs to meet the requirements of slimness. For achieving this purpose, the manufacturers of the keyboard devices make efforts in minimizing the thickness of the luminous keyboard devices. In accordance with the conventional approach, the thicknesses of some components (e.g. the light guide plate and the light-emitting element) of the luminous keyboard device should be as small as possible. However, some drawbacks may occur. For example, the luminous efficiency of a thinner light-emitting element (e.g. the light-emitting element having a thickness smaller than 0.3 mm) is lower than a thicker light-emitting element (e.g. the light-emitting element having a thickness of 0.4 mm or 0.6 mm), and the thinner light-emitting element is more expensive than the thicker light-emitting element. In other words, the conventional luminous keyboard device with the thinner light-emitting element has reduced luminous efficiency and increased cost.

Therefore, there is a need of providing a luminous keyboard device with reduced thickness and enhanced luminous efficiency.

SUMMARY OF THE INVENTION

The present invention provides a luminous keyboard device with reduced thickness and enhanced luminous efficiency.

The present invention also provides a luminous keyboard device with reduced thickness and reduced cost.

In accordance with an aspect of the present invention, there is provided a luminous keyboard device. The luminous keyboard device includes plural keys, a supporting plate, a light-emitting element, and a light guide plate. The plural keys are exposed outside a top surface of the luminous keyboard device. Each of the keys includes at least one light-outputting zone. The supporting plate is disposed under the plural keys and connected with the plural keys for fixing the plural keys. The supporting plate has a first supporting plate opening. The light-emitting element is disposed under the plural keys and inserted into the first supporting plate opening for emitting plural light beams. The light guide plate is disposed under or over the supporting plate for guiding the plural light beams to the plural light-outputting zones of the plural keys. The first supporting plate opening has a first light-guiding slant surface for guiding the plural light beams to be introduced into the light guide plate.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

For overcoming the drawbacks of the conventional luminous keyboard device, the present invention provides an improved luminous keyboard device.

Figure 1:
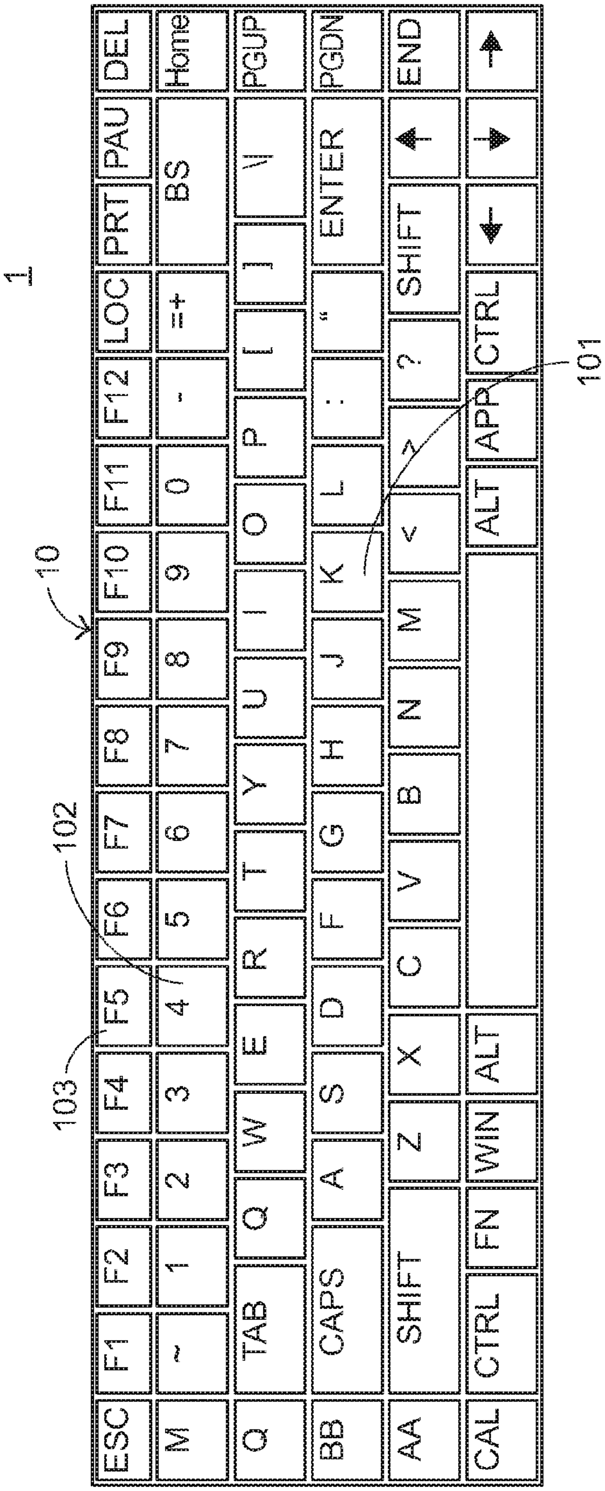
FIG.1 PRIOR ART
FIG. 1 is a schematic top view illustrating the outer appearance of a conventional keyboard device.
Figure 2:
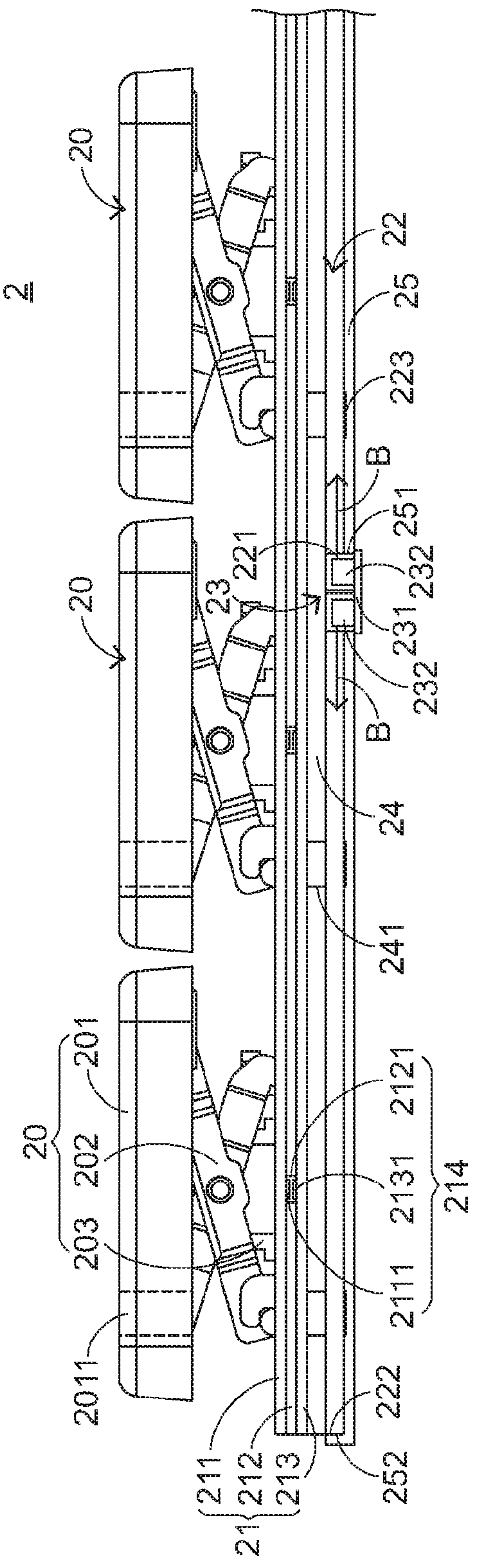
FIG.2 PRIOR ART
FIG. 2 is a schematic cross-sectional view illustrating a conventional luminous keyboard device.
Figure 3:
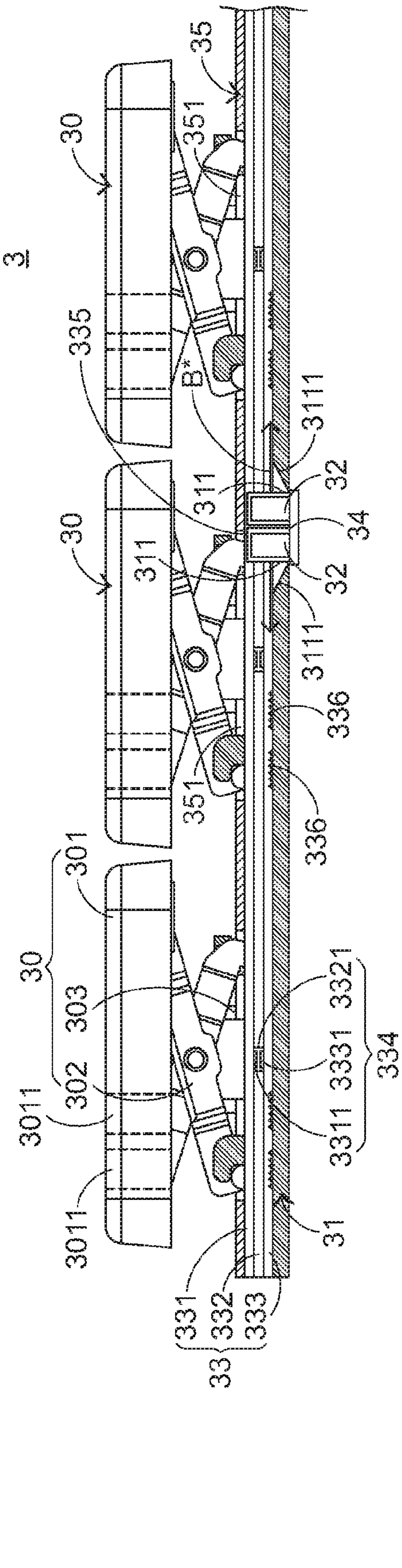
FIG. 3 is a schematic cross-sectional view illustrating a luminous keyboard device according to a first embodiment of the present invention.
Figure 4:
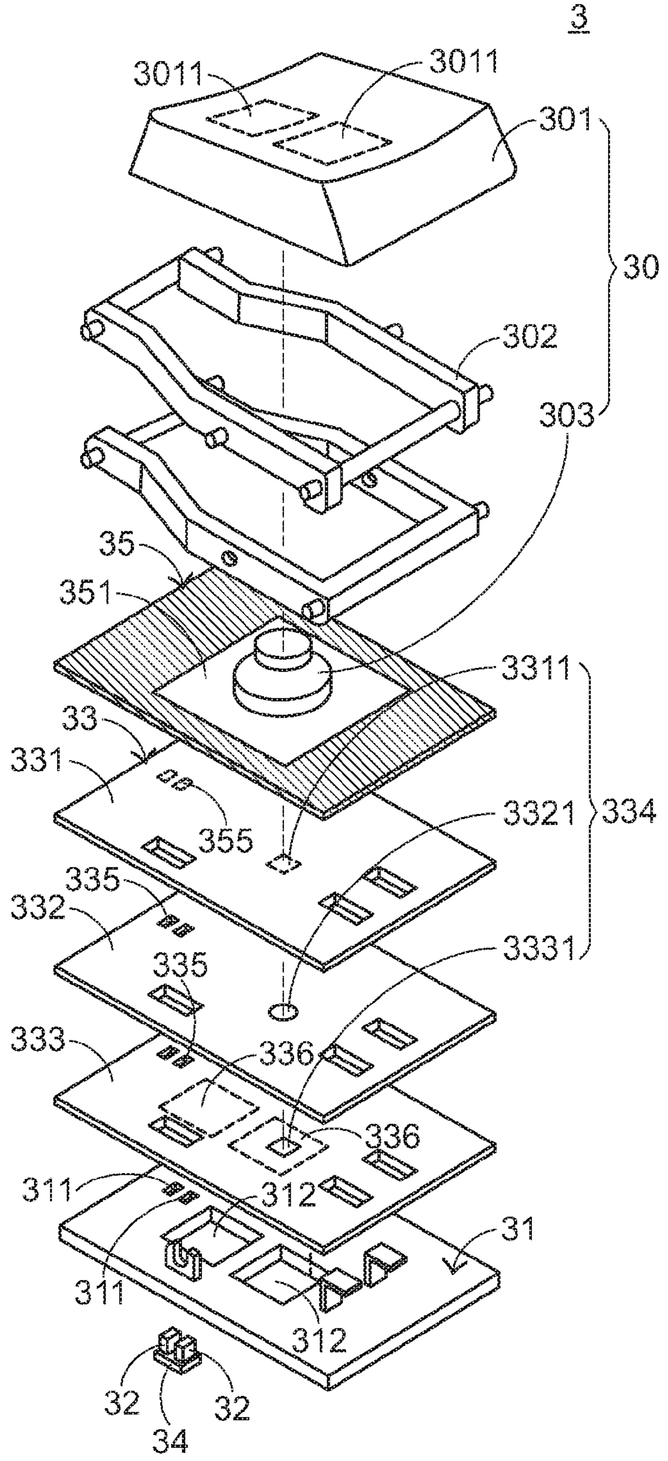
FIG. 4 is a schematic exploded view illustrating a portion of the luminous keyboard device according to the first embodiment of the present invention.

FIG. 3 is a schematic cross-sectional view illustrating a luminous keyboard device according to a first embodiment of the present invention. FIG. 4 is a schematic exploded view illustrating a portion of the luminous keyboard device according to the first embodiment of the present invention. As shown in FIGS. 3 and 4, the luminous keyboard device 3 comprises plural keys 30, a supporting plate 31, plural light-emitting elements 32, a membrane switch circuit module 33 with a light-guiding function, an illumination circuit board 34, and a flexible film 35. For clarification and brevity, only two light-emitting elements 32 are shown in the drawings. The plural keys 30 are exposed outside a top surface of the luminous keyboard device 3. Each key 30 comprises a keycap 301, a connecting element 302, and an elastic element 303. The keycap 301 is exposed outside the top surface of the luminous keyboard device 3. Moreover, the keycap 301 has plural light-outputting zones 3011. The connecting element 302 is arranged between the supporting plate 31 and the keycap 301. The connecting element 302 is used for connecting the supporting plate 31 and the keycap 301 and allowing the keycap 301 to be moved upwardly or downwardly relative to the supporting plate 31. The elastic element 303 is arranged between the membrane switch circuit module 33 and the keycap 301 and disposed on the flexible film 35 for providing an elastic force to the keycap 301. In response to the elastic force, the keycap 301 can be returned to its original position. The flexible film 35 comprises plural light-transmissible zones 351. These light-transmissible zones 351 are aligned with the plural keycaps 301, respectively. In this embodiment, the luminous keyboard device 3 is a keyboard device for a notebook computer (not shown). Moreover, the connecting element 302 is a scissors-type connecting element, the elastic element 303 is a light-transmissible rubbery elastomer, and the flexible film 35 is a black PET (Polyethylene Terephthalate) sheet. Moreover, the membrane switch circuit module 33 is used as a light guide plate. It is noted that the connecting element 302 is not restricted to the scissors-type connecting element. For example, in some other embodiments, the connecting element is implemented by another connecting structure.

The supporting plate 31 is disposed under the plural keys 30 and connected with the plural connecting elements 302 for fixing the plural keys 30. The supporting plate 31 comprises plural first supporting plate openings 311 corresponding to the plural light-emitting elements 32, respectively. Moreover, each of the plural first supporting plate openings 311 has a first light-guiding slant surface 3111. The first light-guiding slant surface 3111 faces the membrane switch circuit module 33. The plural light-emitting elements 32 are disposed under the plural keys 30. Moreover, the plural light-emitting elements 32 are inserted into the plural first supporting plate openings 311, respectively. The plural light-emitting elements 32 are used for emitting plural light beams B*. The illumination circuit board 34 is disposed under the supporting plate 31, and the plural light-emitting elements 32 are disposed on the illumination circuit board 34. The illumination circuit board 34 is used for providing electric power to the plural light-emitting elements 32, thereby driving the plural light-emitting elements 32. In this embodiment, supporting plate 31 is made of an opaque material. Moreover, the plural light-emitting elements 32 are large-sized side-view light-emitting diodes (e.g. the side-view light-emitting diodes having a thickness larger than 0.4 mm), and the illumination circuit board 34 is a flexible circuit board.

Please refer to FIG. 3 again. The membrane switch circuit module 33 is arranged between the plural keys 30 and the supporting plate 31. When the membrane switch circuit module 33 is triggered by the plural elastic elements 303 of the plural keys 30, plural key signals are correspondingly generated. In this embodiment, the membrane switch circuit module 33 comprises an upper wiring board 331, a spacer layer 332 and a lower wiring board 333. The upper wiring board 331 has plural upper contacts 3311. The spacer layer 332 is disposed under the upper wiring board 331. Moreover, the spacer layer 332 comprises plural perforations 3321 corresponding to the plural upper contacts 3311. When the membrane switch circuit module 33 is depressed, a corresponding upper contact 3311 is inserted into the corresponding perforation 3321. The lower wiring board 333 is disposed under the spacer layer 332. Moreover, the lower wiring board 333 comprises plural lower contacts 3331 corresponding to the plural upper contacts 3311. The plural upper contacts 3311, the plural perforations 3321 and the plural lower contacts 3331 are collectively defined as plural key switches 334.

The membrane switch circuit module 33 further comprises plural receiving parts 335 and plural first light-guiding parts 336. The plural receiving parts 335 are exposed to a bottom surface of the lower wiring board 333. Moreover, the plural receiving parts 335 run through the lower wiring board 333 and the spacer layer 332. The plural receiving parts 335 are aligned with the plural first supporting plate openings 311 of the supporting plate 31, respectively. Consequently, the plural light-emitting elements 32 are penetrated through the corresponding first supporting plate openings 311 and inserted into the corresponding receiving parts 335, respectively. The plural first light-guiding parts 336 are disposed on the bottom surface of the lower wiring board 333. Moreover, the plural first light-guiding parts 336 are aligned with the plural light-outputting zones 3011, respectively. The portion of the plural light beams B* that are transferred within the lower wiring board 333 are guided by the plural first light-guiding parts 336 to be directed upwardly to the plural light-outputting zones 3011 of the plural keys 30. From the above discussions, since the spacer layer 332 and the lower wiring board 333 have the light-guiding functions, the spacer layer 332 and the lower wiring board 333 may be used as parts of a light guide plate for guiding the plural light beams B* to the plural light-outputting zones 3011. In other words, the spacer layer 332 and the lower wiring board 333 are made of a light-guiding material, so that the plural light beams B* within the spacer layer 332 and the lower wiring board 333 are subjected to total internal reflection. In this embodiment, the plural first light-guiding parts 336 are V-cut microstructures.

Please refer to FIG. 3 again. From top to bottom, the keycap 301, the scissors-type connecting element 302, the elastic element 303, the flexible film 35, the membrane switch circuit module 33, the supporting plate 31, and the illumination circuit board 34 of the luminous keyboard device 3 are sequentially shown. Moreover, the plural light-emitting elements 32 are disposed on the illumination circuit board 34. Since the light-emitting element 32 is thicker than the supporting plate 31, the light-emitting elements 32 are disposed within the combined structure of the membrane switch circuit module 33 and the supporting plate 31. Moreover, the plural light beams B* from the plural light-emitting elements 32 can be introduced into the membrane switch circuit module 33. Moreover, each keycap 301 comprises the plural light-outputting zones 3011. Each of the plural light-outputting zones 3011 is located at a character region or a symbol region of the keycap 301. For example, the left light-outputting zone 3011 of the keycap 301 is located at a character region "A", and the right light-outputting zone 3011 of the keycap 301 is located at a phonetic symbol region "π".

The illumination of the luminous keyboard device 3 will be illustrated as follows. When the luminous keyboard device 3 is driven and thus enabled, the plural light-emitting elements 32 emit the plural light beams B*. Since portions of the light-outputting surfaces of the plural light-emitting elements 32 are shielded by the supporting plate 31, the plural light beams B* are hindered by the supporting plate 31. However, since the supporting plate 31 has the plural first light-guiding slant surfaces 3111, the plural light beams B* are guided by the plural first light-guiding slant surfaces 3111, and the plural light beams B* are introduced into the spacer layer 332 and the lower wiring board 333 of the membrane switch circuit module 33. After the plural light beams B* are introduced into the spacer layer 332 and the lower wiring board 333 of the membrane switch circuit module 33, the total internal reflection occurs within the spacer layer 332 and the lower wiring board 333. When the plural light beams B* are projected onto the plural first light-guiding parts 336, the total internal reflection of the plural light beams B* is destroyed by the plural first light-guiding parts 336, and the plural light beams B* are directed upwardly. Under this circumstance, the plural light beams B* are directed to the plural light-outputting zones 3011 through the membrane switch circuit module 33 and plural light-transmissible zones 351 in order to illuminate the plural keys 30.

Moreover, since the first supporting plate opening 311 of the supporting plate 31 has the first light-guiding slant surface 3111, the fraction of the light-outputting surface of the light-emitting element 32 shielded by the supporting plate 31 will be reduced. Under this circumstance, the light amount of the plural light beams B* to be introduced into the membrane switch circuit module 33 can be increased, and thus the luminous efficiency can be enhanced. Moreover, in this embodiment, the plural first light-guiding parts 336 are disposed on the bottom surface of the lower wiring board 333. Alternatively, in some other embodiments, the plural first light-guiding parts may be disposed on a bottom surface of the upper wiring board or a bottom surface of the spacer layer.

Figure 5:
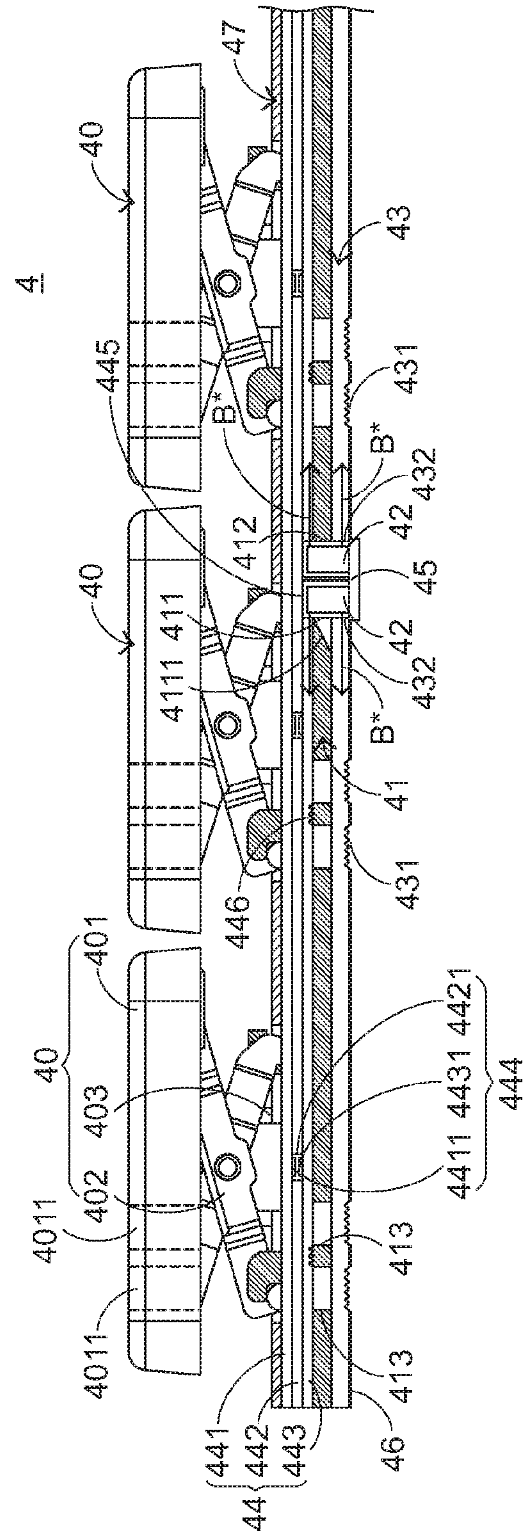
FIG. 5 is a schematic cross-sectional view illustrating a luminous keyboard device according to a second embodiment of the present invention.
Figure 6:
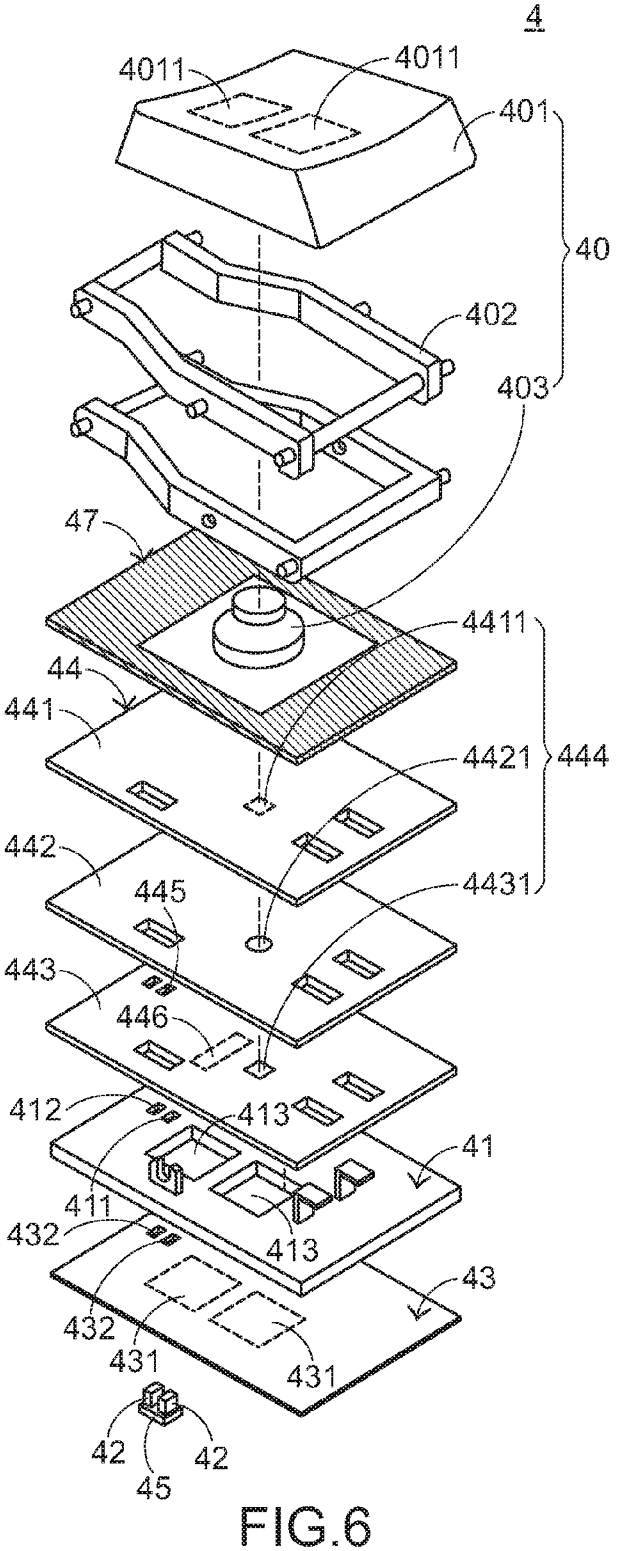
FIG. 6 is a schematic exploded view illustrating a portion of the luminous keyboard device according to the second embodiment of the present invention.

The present invention further provides a luminous keyboard device according to a second embodiment of the present invention. FIG. 5 is a schematic cross-sectional view illustrating a luminous keyboard device according to a second embodiment of the present invention. FIG. 6 is a schematic exploded view illustrating a portion of the luminous keyboard device according to the second embodiment of the present invention. As shown in FIGS. 5 and 6, the luminous keyboard device 4 comprises plural keys 40, a supporting plate 41, plural light-emitting elements 42, a light guide plate 43, a membrane switch circuit module 44, an illumination circuit board 45, a reflecting part 46, and a flexible film 47. For clarification and brevity, only two light-emitting elements 42 are shown in the drawings. The plural keys 40 are exposed outside a top surface of the luminous keyboard device 4. Each key 40 comprises a keycap 401, a connecting element 402, and an elastic element 403. Moreover, the keycap 401 has plural light-outputting zones 4011.

Except for the following two items, the structures and the operations of the luminous keyboard device 4 of this embodiment are substantially identical to those of the luminous keyboard device 3 of the first embodiment, and are not redundantly described herein.

Firstly, the supporting plate 41 of the luminous keyboard device 4 of this embodiment comprises a first supporting plate opening 411, a second supporting plate opening 412, and plural third supporting plate openings 413. As shown in FIG. 5, the first supporting plate opening 411 is aligned with the left light-emitting element 42, and the left light-emitting element 42 is inserted into the first supporting plate opening 411. Moreover, as shown in FIG. 5B, the second supporting plate opening 412 is aligned with the right light-emitting element 42, and the right light-emitting element 42 is inserted into the second supporting plate opening 412. Moreover, the plural third supporting plate openings 413 are aligned with the plural light-outputting zones 4011 of the plural keys 40, respectively. The first supporting plate opening 411 has a first light-guiding slant surface 4111. The first light-guiding slant surface 4111 faces the light guide plate 43. Due to the first light-guiding slant surface 4111, the light amount of the plural light beams B* to be introduced into the light guide plate 43 can be increased.

Secondly, the luminous keyboard device 4 of this embodiment comprises further comprises the light guide plate 43 and the reflecting part 46. The light guide plate 43 is disposed under the supporting plate 41 for guiding the plural light beams B* to the plural light-outputting zones 4011 of the plural keys 40 through the plural third supporting plate openings 413. The light guide plate 43 comprises plural second light-guiding parts 431 and plural light guide plate openings 432. The plural second light-guiding parts 431 are aligned with the plural third supporting plate openings 413, respectively. The plural second light-guiding parts 431 are disposed on a bottom surface of the light guide plate 43, and located under the plural third supporting plate openings 413, respectively. The plural second light-guiding parts 431 are used for guiding the plural light beams B* to be directed upwardly to the plural light-outputting zones 4011 of the plural keys 40 through the plural third supporting plate openings 413. The light guide plate openings 432 run through the light guide plate 43. Moreover, each of the light guide plate openings 432 is aligned with the corresponding first supporting plate opening 411 or the corresponding second supporting plate opening 412. Each of the plural light-emitting elements 42 is inserted into the corresponding light guide plate opening 432 and the corresponding first supporting plate opening 411 (or the corresponding second supporting plate opening 412). Consequently, the plural light beams B* from the plural light-emitting elements 42 can be directed to the light guide plate 43 and the membrane switch circuit module 44. In this embodiment, the plural second light-guiding parts 431 are V-cut microstructures Moreover, the reflecting part 46 is disposed under the light guide plate 43 for reflecting the plural light beams B*. Consequently, the plural light beams B* are directed upwardly to be introduced into the light guide plate 43. In this embodiment, the reflecting part 46 is a reflective ink layer, which is printed on the bottom surface of the light guide plate 43. Alternatively, in some other embodiments, the reflecting part 46 is a reflecting plate.

The structures of the upper wiring board 441, the spacer layer 442 and the lower wiring board 443 of the membrane switch circuit module 44 are substantially identical to those of the membrane switch circuit module 33 of the luminous keyboard device 3 of the first embodiment except that the membrane switch circuit module 44 further comprises plural receiving parts 445 and plural first light-guiding parts 446. For clarification and brevity, only two receiving parts 445 are shown in the drawings. Each of the receiving parts 445 is aligned with the corresponding first supporting plate opening 411 or the corresponding second supporting plate opening 412. Moreover, the plural receiving parts 445 are exposed to a bottom surface of the lower wiring board 443. Consequently, each of the plural light-emitting elements 42 is penetrated through the corresponding first supporting plate opening 411 or the corresponding second supporting plate opening 412 and inserted into the corresponding receiving part 445. The plural first light-guiding parts 446 are disposed on the bottom surface of the lower wiring board 443, and arranged between the plural third supporting plate openings 413. The portions of the plural light beams B* transferred within the lower wiring board 443 are guided by the plural first light-guiding parts 446 to be directed upwardly to the plural light-outputting zones 4011 of the plural keys 40. From the above discussions, the lower wiring board 443 has a light-guiding function for guiding the plural light beams B* to the plural light-outputting zones 4011. In other words, the lower wiring board 443 is made of a light-guiding material, so that the plural light beams B* within the lower wiring board 443 are subjected to total internal reflection.

Please refer to FIG. 6 again. From top to bottom, the keycap 401, the connecting element 402, the elastic element 403, the flexible film 47, the membrane switch circuit module 44, the supporting plate 41, the light guide plate 43, the reflecting part 46 and the illumination circuit board 45 of the luminous keyboard device 4 are sequentially shown. Moreover, the plural light-emitting elements 42 are disposed on the illumination circuit board 45. Since the light-emitting element 42 is thicker than the light guide plate 43, each light-emitting element 42 is sequentially inserted into the corresponding light guide plate opening 432, the corresponding first supporting plate opening 411 (or the corresponding second supporting plate opening 412) and the corresponding receiving part 445. In other words, the plural light-emitting elements 42 are disposed within the combined structure of the membrane switch circuit module 44, the supporting plate 41, the light guide plate 43 and the reflecting part 46. Moreover, the plural light beams B* from the plural light-emitting elements 42 can be introduced into the light guide plate 43 and the membrane switch circuit module 44.

The illumination of the luminous keyboard device 4 will be illustrated as follows. When the luminous keyboard device 4 is driven and thus enabled, the plural light-emitting element 42 that is sequentially inserted into the corresponding light guide plate opening 432, the corresponding first supporting plate opening 411 (or the corresponding second supporting plate opening 412) and the corresponding receiving part 445 will emit the plural light beams B*. A first portion of the plural light beams B* are travelled along the path under the supporting plate 41 and introduced into the light guide plate 43. A second portion of the plural light beams B* are travelled along the path over the supporting plate 41 and introduced into the lower wiring board 443. After the first portion of the plural light beams B* are introduced into the light guide plate 43, the total internal reflection occurs within the light guide plate 43. When the plural light beams B* are projected onto the plural second light-guiding parts 431, the total internal reflection of the plural light beams B* is destroyed by the plural second light-guiding parts 431, and the plural light beams B* are directed upwardly. Then, the plural light beams B* are directed to the plural light-outputting zones 4011 through the plural third supporting plate openings 413 and the membrane switch circuit module 44 in order to illuminate the plural keys 40.

On the other hand, after the second portion of the plural light beams B* are introduced into the lower wiring board 443 of the membrane switch circuit module 44, the total internal reflection occurs within the lower wiring board 443. When the plural light beams B* are projected onto the plural first light-guiding parts 446 near the third supporting plate openings 413, the total internal reflection of the plural light beams B* is destroyed by the plural first light-guiding parts 446, and the plural light beams B* are directed upwardly. Then, the plural light beams B* are departed from the membrane switch circuit module 44 and directed to the plural light-outputting zones 4011. Under this circumstance, the luminous efficiency of the plural keys 40 will be enhanced.

In this embodiment, the receiving parts 445 do not run through the lower wiring board 443. For clarification and brevity, the top parts of the receiving parts 443 are not shown in the drawings. After the light-emitting elements 42 are inserted into the corresponding receiving parts 445, the plural light beams B* from the light-emitting elements 42 can be introduced into the lower wiring board 443 (see FIG. 5). Moreover, since the first supporting plate opening 411 of the supporting plate 41 has the first light-guiding slant surface 4111, the fraction of the light-outputting surface of the light-emitting element 42 shielded by the supporting plate 41 will be reduced. Under this circumstance, the light amount of the plural light beams B* to be introduced into the light guide plate 43 can be increased, and thus the luminous efficiency can be enhanced. On the other hand, since the second supporting plate opening 412 of the supporting plate 41 has no light-guiding slant surface, the light amount of the plural light beams B* from the right light-emitting element 42 of FIG. 5 to be introduced into the light guide plate 43 is higher than the light amount of the plural light beams B* from the left light-emitting element 42 of FIG. 5 to be introduced into the light guide plate 43. In other words, according to the presence or absence of the light-guiding slant surface, the light amount of the light beams to be introduced into the light guide plate of the luminous keyboard device of the present invention are adjustable. For example, if the light-guiding slant surface located near the region of the luminous keyboard device with lower luminous efficiency, the luminous efficiency can be enhanced.

Figure 7:
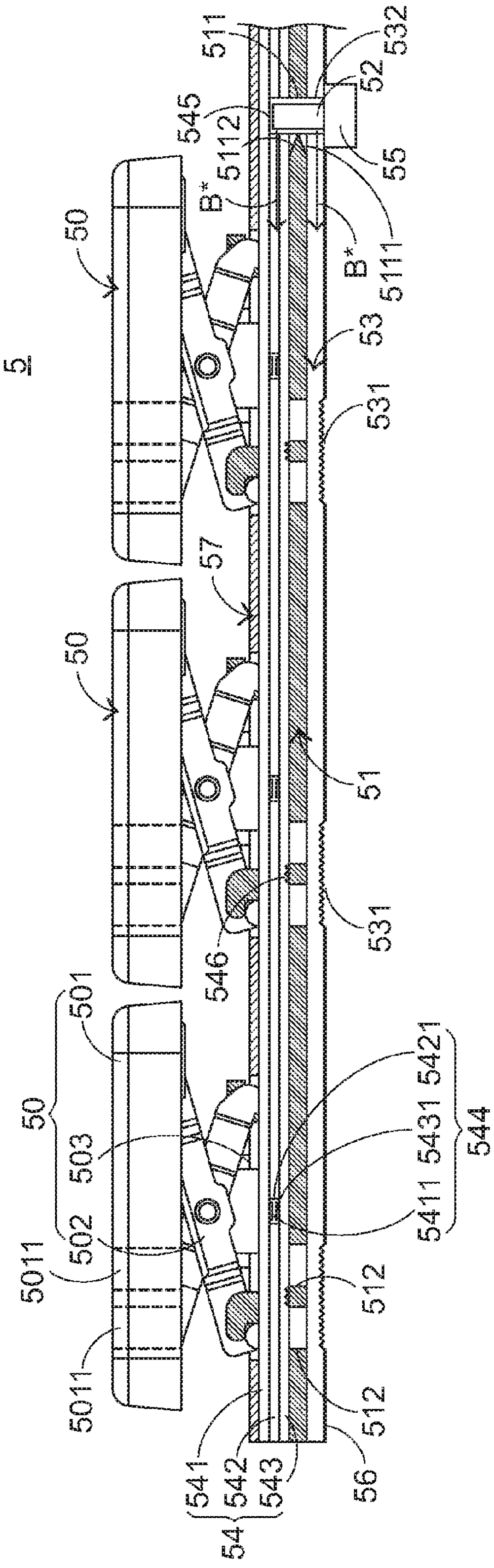
FIG. 7 is a schematic cross-sectional view illustrating a luminous keyboard device according to a third embodiment of the present invention.

The present invention further provides a luminous keyboard device according to a third embodiment of the present invention. FIG. 7 is a schematic cross-sectional view illustrating a luminous keyboard device according to a third embodiment of the present invention. As shown in FIG. 7, the luminous keyboard device 5 comprises plural keys 50, a supporting plate 51, plural light-emitting elements 52, a light guide plate 53, a membrane switch circuit module 54, an illumination circuit board 55, a reflecting part 56, and a flexible film 57. For clarification and brevity, only one light-emitting element 52 is shown in the drawing. The plural keys 50 are exposed outside a top surface of the luminous keyboard device 5. Each key 50 comprises a keycap 501, a connecting element 502, and an elastic element 503. Moreover, the keycap 501 has plural light-outputting zones 5011. The supporting plate 51 comprises a first supporting plate opening 511 and plural second supporting plate openings 512.

Except for the following four items, the structures and the operations of the luminous keyboard device 5 of this embodiment are substantially identical to those of the luminous keyboard device 4 of the second embodiment, and are not redundantly described herein.

Firstly, the membrane switch circuit module 54 comprises an upper wiring board 541, a spacer layer 542, a lower wiring board 543, plural receiving parts 545, and plural first light-guiding parts 546. For clarification and brevity, only one receiving part 545 is shown in the drawing. The structures of the upper wiring board 541, the spacer layer 542 and the lower wiring board 543 are substantially identical to those of the luminous keyboard device 4 of the second embodiment, but are and somewhat distinguished. In comparison with the second embodiment, the plural receiving parts 545 are exposed to a bottom surface of the lower wiring board 543, and run through the lower wiring board 543. The plural receiving parts 545 are aligned with the plural first supporting plate openings 511, respectively. Consequently, the plural light-emitting elements 52 are penetrated through the corresponding first supporting plate openings 511 and inserted into the corresponding receiving parts 545, respectively. Consequently, the plural light beams B* from the light-emitting elements 52 can be introduced into the spacer layer 542. The plural first light-guiding parts 546 are disposed on the bottom surface of the lower wiring board 543, and located near the plural second supporting plate openings 512. The portions of the plural light beams B* transferred within the lower wiring board 543 are guided by the plural first light-guiding parts 546 to be directed upwardly to the plural light-outputting zones 5011 of the plural keys 50. Moreover, in this embodiment, the plural second light-guiding parts 531 of the light guide plate 53 are texturing structures, and the plural first light-guiding parts 546 of the lower wiring board 543 are V-cut microstructures.

Secondly, the plural light-emitting elements 52 are disposed on the illumination circuit board 55, and located at a side of the light guide plate 53 and a side of the membrane switch circuit module 54. In addition, the plural light-emitting elements 52 are inserted into the corresponding first supporting plate openings 511 and the corresponding receiving parts 545, respectively. Consequently, the plural light beams B* from the light-emitting elements 52 are introduced into the light guide plate 53 and the spacer layer 542 of the membrane switch circuit module 54. In this embodiment, the illumination circuit board 55 is a printed circuit board.

Thirdly, each of the second light-guiding part 531 of the light guide plate 53 is aligned with two light-outputting zones 5011 of a keycap 501 and two second supporting plate openings 512 of the supporting plate 51.

Fourthly, the first supporting plate opening 511 has a first light-guiding slant surface 5111 and a second light-guiding slant surface 5112. The first light-guiding slant surface 5111 and the second light-guiding slant surface 5112 are collaboratively defined as a sharp edge. The first light-guiding slant surface 5111 faces the light guide plate 53. The second light-guiding slant surface 5112 faces the membrane switch circuit module 54. When the plural light beams B* are emitted by the light-emitting elements 52, a larger portion of the light beams B* are guided by the first light-guiding slant surface 5111 to be introduced into the light guide plate 53, and another larger portion of the light beams B* are guided by the second light-guiding slant surface 5112 to be introduced into the membrane switch circuit module 54. In other words, the light amount of the plural light beams B* hindered by the supporting plate 51 will be reduced. Under this circumstance, the light amount of specified regions will be enhanced.

Figure 8:
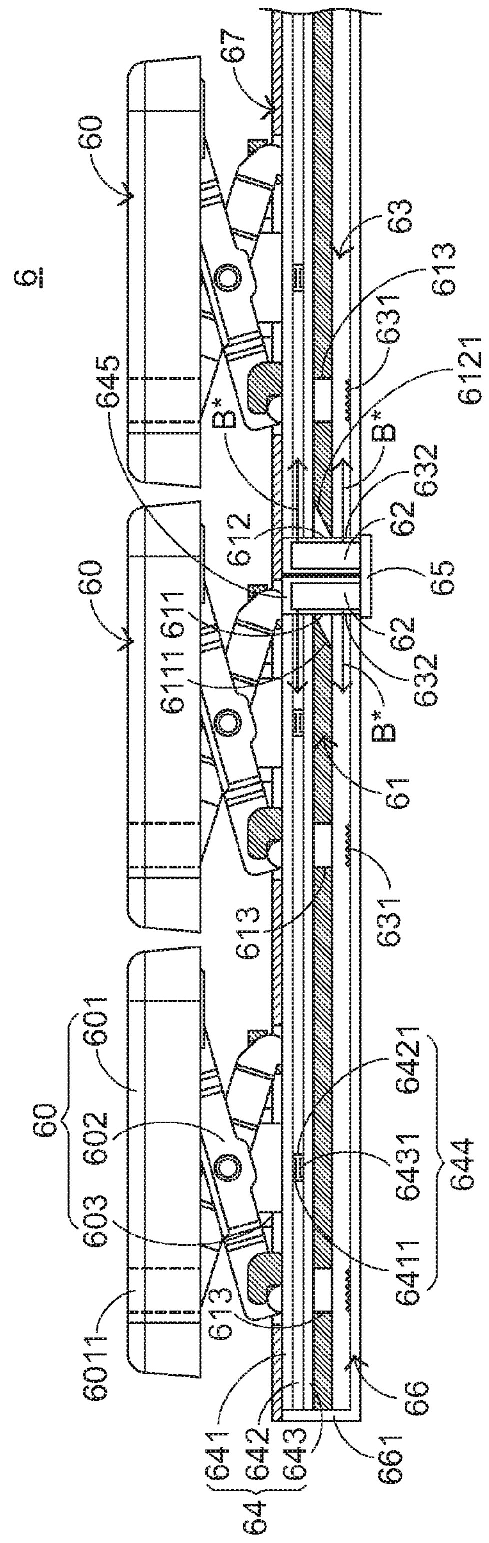
FIG. 8 is a schematic cross-sectional view illustrating a luminous keyboard device according to a fourth embodiment of the present invention.

The present invention further provides a luminous keyboard device according to a fourth embodiment of the present invention. FIG. 8 is a schematic cross-sectional view illustrating a luminous keyboard device according to a fourth embodiment of the present invention. As shown in FIG. 8, the luminous keyboard device 6 comprises plural keys 60, a supporting plate 61, plural light-emitting elements 62, a light guide plate 63, a membrane switch circuit module 64, an illumination circuit board 65, a reflecting part 66, and a flexible film 67. For clarification and brevity, only two light-emitting elements 62 are shown in the drawing. The plural keys 60 are exposed outside a top surface of the luminous keyboard device 6. Each key 60 comprises a keycap 601, a connecting element 602, and an elastic element 603. Moreover, the keycap 601 has plural light-outputting zones 6011. The supporting plate 61 comprises a first supporting plate opening 611, a second supporting plate opening 612, and plural third supporting plate openings 613.

Except for the following five items, the structures and the operations of the luminous keyboard device 6 of this embodiment are substantially identical to those of the luminous keyboard device 3 of the first embodiment, and are not redundantly described herein.

Firstly, the membrane switch circuit module 64 of the luminous keyboard device 6 of this embodiment does not comprise plural first light-guiding parts. Although the membrane switch circuit module 64 fails to guide the plural light beams B* to the plural light-outputting zones 6011, a small portion of the light beams B* may be leaked out from the membrane switch circuit module 64 during the total internal reflection of the plural light beams B* within the upper wiring board 641, the spacer layer 642 and the lower wiring board 643. Due to the small portion of the light beams B*, the luminous efficiency of the luminous keyboard device 6 is slightly increased. Alternatively, in some other embodiments, the membrane switch circuit module comprises plural second light-guiding parts, and the plural second light-guiding parts are disposed on a bottom surface of the upper wiring board for guiding the plural beams. Consequently, the luminous efficiency of the luminous keyboard device is further enhanced.

Secondly, the reflecting part 66 of this embodiment is a reflecting plate. A lateral edge 661 of the reflecting part 66 is formed as a bent structure to enclose a lateral edge 633 of the light guide plate 63. Due to the bent structure, the problem of causing light leakage through the lateral edge 633 of the light guide plate 63 can be eliminated. Moreover, the reflecting part 66 comprises plural reflecting plate openings 662. The plural reflecting plate openings 662 are aligned with the plural light-emitting elements 62, respectively. After each of the plural light-emitting elements 62 on the illumination circuit board 65 is sequentially penetrated through the corresponding reflecting plate opening 662 of the reflecting part 66, the corresponding light guide plate opening 632 of the light guide plate 63, the corresponding first supporting plate opening 611 (or the second supporting plate opening 612) of the supporting plate 61 and the corresponding receiving part 645 of the membrane switch circuit module 64, the plural light beams B* from the corresponding light-emitting element 62 are introduced into the light guide plate 63 and the membrane switch circuit module 64.

Thirdly, each keycap 601 has only one light-outputting zone 6011. In addition, the plural third supporting plate openings 613 of the supporting plate 61 are aligned with the plural light-outputting zones 6011 of the plural keycaps 601, respectively. In other words, each key 60 of the luminous keyboard device 6 of this embodiment has a single character region or a single symbol region. For example, the luminous keyboard device 6 is a US keyboard device.

Fourthly, the first supporting plate opening 611 has a first light-guiding slant surface 6111 facing the light guide plate 63, and the second supporting plate opening 612 has a second light-guiding slant surface 6121 facing the membrane switch circuit module 64. When the plural light beams B* are emitted by the light-emitting elements 62, a larger portion of the light beams B* are guided by the first light-guiding slant surface 6111 to be introduced into the light guide plate 63, so that the light amount of the plural light beams B* to be introduced into the light guide plate 63 is increased. In addition, another larger portion of the light beams B* are guided by the second light-guiding slant surface 6121 to be introduced into the membrane switch circuit module 64, so that the light amount of the plural light beams B* to be introduced into the light guide plate 63 is decreased. Under this circumstance, the light amount of a specified region (e.g. a darker region) will be increased, and the light amount of another specified region (e.g. a lighter region) will be decreased. Consequently, the plural keys 60 can be illuminated more uniformly.

Fifthly, the membrane switch circuit module 64 comprises an upper wiring board 641, a spacer layer 642, a lower wiring board 643 and plural receiving parts 645. The structures of the upper wiring board 641, the spacer layer 642 and the lower wiring board 643 are substantially identical to those of the luminous keyboard device 3 of the first embodiment, but are and somewhat distinguished. In comparison with the first embodiment, the plural receiving parts 645 are exposed to a bottom surface of the lower wiring board 643, and run through the lower wiring board 643, the spacer layer 642 and the upper wiring board 641. Each of the receiving parts 645 is aligned with the corresponding first supporting plate opening 611 or the corresponding second supporting plate opening 612. Consequently, each of the plural light-emitting elements 62 is penetrated through the corresponding first supporting plate opening 611 or the corresponding second supporting plate opening 612 and inserted into the corresponding receiving part 645. Moreover, the plural light-emitting elements 62 are shielded by the flexible film 67 without being exposed outside the membrane switch circuit module 64. Consequently, the plural light beams B* from the light-emitting elements 62 can be introduced into the upper wiring board 641, the spacer layer 642 and the lower wiring board 643. That is, the plural light beams B* are subjected to total internal reflection within the upper wiring board 641, the spacer layer 642 and the lower wiring board 643.

From the above descriptions, the present invention provides a luminous keyboard device. The luminous keyboard device of the present invention utilizes thicker light-emitting elements. Consequently, the luminous efficiency of the light beams from the light-emitting elements will be enhanced. Moreover, the opaque supporting plate has plural first supporting plate openings corresponding to the light-emitting elements. The light-emitting elements are penetrated through the first supporting plate openings, so that the light beams from the light-emitting elements can be introduced into the membrane switch circuit module. Under this circumstance, the luminous efficiency of the luminous keyboard device is slightly increased. Moreover, the luminous keyboard device of the present invention may use a thinner light guide plate in order to meet the requirement of slimness. In other words, the uses of the thicker light-emitting elements can increase the luminous efficiency and reduce the cost while reducing the overall thickness of the luminous keyboard device. Moreover, the first supporting plate opening has a first light-guiding slant surface for controlling the light amount of the light beams to be introduced into the light guide plate. Consequently, the plural keys of the luminous keyboard device can be uniformly illuminated.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all modifications and similar structures.

What is claimed is:

1. A luminous keyboard device, comprising:

plural keys exposed outside a top surface of said luminous keyboard device, wherein each of said keys comprises at least one light-outputting zone;

a supporting plate disposed under said plural keys and connected with said plural keys for fixing said plural keys, wherein said supporting plate has a first supporting plate opening;

a light-emitting element disposed under said plural keys and inserted into said first supporting plate opening for emitting plural light beams; and a light guide plate disposed under or over said supporting plate for guiding said plural light beams to said plural light-outputting zones of said plural keys, wherein said first supporting plate opening has a first light-guiding slant surface for guiding said plural light beams to be introduced into said light guide plate.

2. The luminous keyboard device according to claim 1, wherein said light guide plate is a membrane switch circuit module with a light-guiding function, and said light guide plate is disposed over said supporting plate, wherein said membrane switch circuit module comprises:

an upper wiring board having plural upper contacts;

a spacer layer disposed under said upper wiring board, and having plural perforations corresponding to said plural upper contacts, wherein when said membrane switch circuit module is depressed, a corresponding upper contact is inserted into a corresponding perforation; and a lower wiring board disposed under said spacer layer, and having plural lower contacts corresponding to said plural upper contacts, wherein said plural lower contacts and said plural upper contacts are collectively defined as plural key switches, wherein at least one of said upper wiring board, said spacer layer and said lower wiring board has said light-guiding function for guiding said plural light beams to said plural light-outputting zones of said plural keys.

3. The luminous keyboard device according to claim 2, wherein said membrane switch circuit module further comprises:

a receiving part exposed to a bottom surface of said lower wiring board and aligned with said first supporting plate opening, wherein said light-emitting element is penetrated through said first supporting plate opening and inserted into said receiving part; and plural first light-guiding parts disposed on said bottom surface of said lower wiring board for guiding said plural light beams to be directed upwardly to said plural light-outputting zones of said plural keys.

4. The luminous keyboard device according to claim 2, wherein said membrane switch circuit module further comprises:

a receiving part exposed to a bottom surface of said lower wiring board, running through said lower wiring board, and aligned with said first supporting plate opening, wherein said light-emitting element is penetrated through said first supporting plate opening and inserted into said receiving part; and plural first light-guiding parts disposed on at least one of said bottom surface of said lower wiring board and a bottom surface of said spacer layer for guiding said plural light beams to be directed upwardly to said plural light-outputting zones of said plural keys.

5. The luminous keyboard device according to claim 2, wherein said membrane switch circuit module further comprises:

a receiving part exposed to a bottom surface of said lower wiring board, running through said lower wiring board and said spacer layer, and aligned with said first supporting plate opening, wherein said light-emitting element is penetrated through said first supporting plate opening and inserted into said receiving part; and plural first light-guiding parts disposed on at least one of said bottom surface of said lower wiring board, a bottom surface of said spacer layer and a bottom surface of said upper wiring board for guiding said plural light beams to be directed upwardly to said plural light-outputting zones of said plural keys.

6. The luminous keyboard device according to claim 1, wherein said supporting plate further comprises plural second supporting plate openings, and said light guide plate is disposed under said supporting plate, wherein said light guide plate comprises at least one second light-guiding part, wherein said at least one second light-guiding part is disposed on a bottom surface of said light guide plate and located under said plural second supporting plate openings for guiding said plural light beams to be directed upwardly to said plural light-outputting zones of said plural keys through said plural second supporting plate openings.

7. The luminous keyboard device according to claim 6, wherein said at least one second light-guiding part is a V-cut microstructure, a texturing structure or a light-guiding ink layer.

8. The luminous keyboard device according to claim 6, wherein said light guide plate further comprises a light guide plate opening, which runs through said light guide plate and is disposed under said first supporting plate opening, wherein said light-emitting element is inserted into said light guide plate opening and said first supporting plate opening, so that said plural light beams from said light-emitting element are directed to said light guide plate.

9. The luminous keyboard device according to claim 1, wherein said first light-guiding slant surface faces said light guide plate for increasing the amount of said light beams to be introduced into said light guide plate.

10. The luminous keyboard device according to claim 1, further comprising an illumination circuit board, which is located at a side of said light guide plate or disposed under said light guide plate, wherein said light-emitting element is disposed on said illumination circuit board, and said illumination circuit board provides electric power to said light-emitting element.

11. The luminous keyboard device according to claim 1, further comprising a reflecting part, wherein said reflecting part is disposed under said light guide plate for reflecting said plural light beams, so that said plural light beams are directed upwardly to be introduced into said light guide plate.

12. The luminous keyboard device according to claim 11, wherein said reflecting part is a reflective ink layer, which is printed on a bottom surface of said light guide plate.

13. The luminous keyboard device according to claim 11, wherein said reflecting part is a reflecting plate, wherein said reflecting plate comprises a reflecting plate opening, and said light-emitting element is inserted into said reflecting plate opening, wherein at least one lateral edge of said reflecting plate is formed as a bent structure to enclose a lateral edge of said light guide plate.

14. The luminous keyboard device according to claim 1, wherein each of said plural keys comprises:

a keycap exposed to said top surface of said luminous keyboard device, wherein said light-outputting zone is formed on said keycap;

a connecting element arranged between said supporting plate and said keycap for connecting said supporting plate and said keycap, and allowing said keycap to be moved upwardly and downwardly relative to said supporting plate; and an elastic element arranged between said light guide plate and said keycap for providing an elastic force to said keycap, wherein said keycap is returned to an original position in response to said elastic force.

* * * * *